Nov. 4, 1958  S. L. ROSS  2,858,676
APPARATUS AND METHOD FOR PRODUCING FOUNDATIONS
Filed June 13, 1955
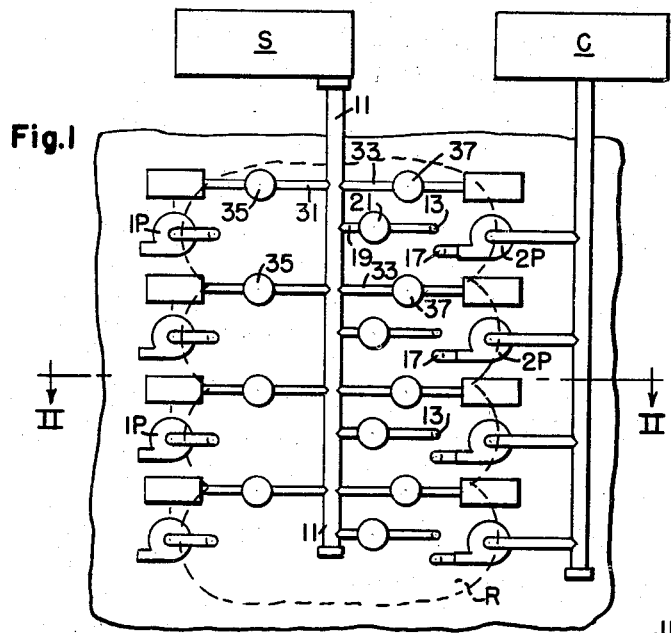
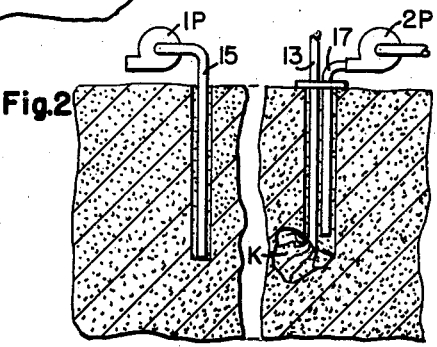
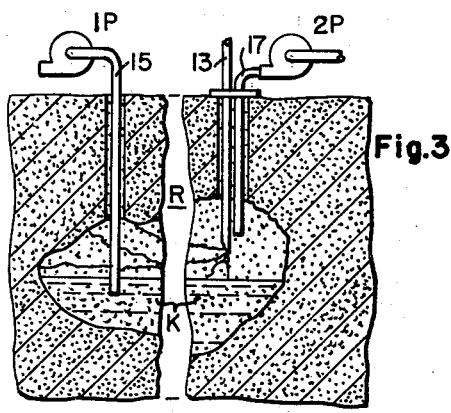
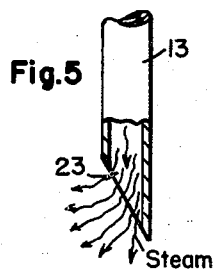
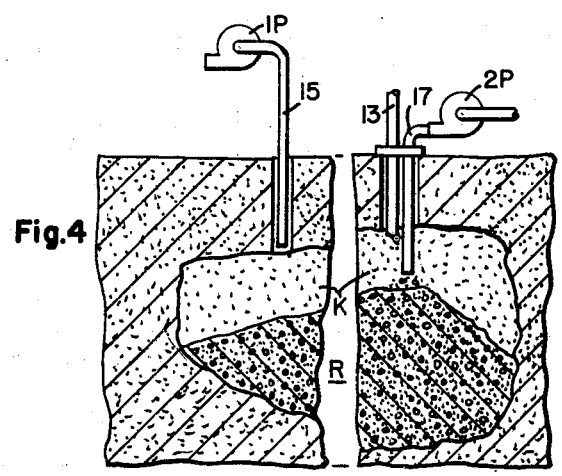

United States Patent Office 2,858,676
Patented Nov. 4, 1958

2,858,676

APPARATUS AND METHOD FOR PRODUCING FOUNDATIONS

Sigmund L. Ross, Pittsburgh, Pa.

Application June 13, 1955, Serial No. 514,958

6 Claims. (Cl. 61—36)

This invention relates to apparatus and method for producing rigid foundations in soil material and has particular relation to such apparatus and methods for producing rigid foundations in soil material which has a relatively high content of moisture.

Quantitatively it is customary to define dry earth as that soil which has about 5% by weight water, damp or moist earth as soil having about 10% water, wet earth as soil having about 20% water, and saturated earth as soil having about 25% to 30% water. Qualitatively soil is said to be saturated when water is present in it to such an extent that it occupies substantially interstitial spaces. The higher the water content of the soil the smaller its load bearing capacity. Granular soil such as sandy soil likewise has a small bearing capacity.

In accordance with the teachings of the prior art, the load bearing property of the soil is improved by introducing porosity in the soil and filling the cavities of the porous soil with a solid material. Thus, one of the methods practiced in accordance with the teachings of the prior art is to drive the water out of the soil and in addition to fuse the soil into a porous mass by subjecting the soil to the intense heat produced by thermit bombs for example, and thereafter injecting sulphur into the pores. Another practice, in accordance with the teachings of the prior art, is to drive pilings into the soil to a depth where they strike solid strata and then capping the piles. The above described prior art is labor consuming and costly.

It is, accordingly, broadly an object of this invention to provide a method and apparatus for producing a rigid or bed-rock foundation in soil at relatively low labor and material costs.

Another object of this invention is to provide apparatus and a method for producing in effect a bed-rock foundation in wet or saturated oil.

A specific object of this invention is to provide a method and apparatus for producing a bed-rock foundation in dry soil, for example, sandy soil.

This invention arises from the realization that when the moist soil in a region is subjected to a moderately high temperature the moisture in the soil tends to vaporize, increasing in volume substantially. This increase in volume increases the pressure, compressing the moist soil and producing a cavity which may readily be filled with a solid mass of a setting material such as concrete. This invention then is based on the concept of making use of the water in the soil rather than driving it off.

In accordance with this invention, steam or any other fluid at a moderately high temperature of the order of 850 to 900° F. is projected into the moist or saturated soil. The hot fluid flashes the moisture in the soil vaporizing it and the resulting pressure produces cavities in the soil. Once the cavities are created the setting material such as concrete may be injected into the cavities and a bed-rock foundation is formed after the setting material sets.

In the specific practice of this invention, the surface of the region in which the foundation is to be provided is first prepared by compressing the surface with rollers and tampers. The superheated fluid is then introduced under pressure into the sub-strata through pipes or casings. The moisture in the soil is then flashed into steam and as the steam expands it causes subterranean cavities to form. The size of the cavities and the time required to produce each cavity depend on the soil bearing property of the ground and on its water content. The soil bearing properties may range from 750# per square foot to 3000# per square foot. The time for forming a cavity may vary from about 15 minutes to about 1 hour over this range of bearing properties. After the cavities are formed, concrete is introduced under pressure into the cavities. The pressure utilized is such as, in effect, to ram the particles of concrete into the soil bounding the cavities and ultimately filling the hole itself. The bed-rock foundation is thus formed.

In its specific aspects this invention is also applicable to the forming of a rigid foundation in soil having a relatively low water content, for example, sandy soil. Under such circumstances, the soil is prepared for the formation of the foundation by being saturated with water by artificial means of one type or another. Once the soil is saturated the foundation is formed as described above.

The novel features considered characteristic of this invention are disclosed generally above. The invention itself, both as to its organization and its method of operation, together with additional objects and advantages thereof, will be understood from the following description of a specific embodiment when read in connection with the accompanying drawings, in which:

Figure 1 is a diagrammatic view showing in plan a preferred embodiment of this invention;

Fig. 2 is a view in section taken along line II—II of Fig. 1 showing the condition of the apparatus and the soil as the foundation forming process is started;

Fig. 3 is a section similar to Fig. 2 but showing the apparatus in a more advanced stage of the process;

Fig. 4 is a section similar to Fig. 2 showing the apparatus in a late stage in the process; and Fig. 5 is a view in section of a steam pipe or casing used in the practice of this invention.

In Figs. 1 through 4, this invention is shown as applied to the producing of a rigid foundation under a region R with apparatus including a source S of superheated steam and a container including a suitable mixture of concrete. The steam source S may be of any type known in the art and usually includes a boiler and a superheater adequate to superheat the steam to about 850° or 950° F. Steam is supplied from the source C through a main pipe 11.

The apparatus also includes a plurality of steam injecting pipes or casings 13, a plurality of exhaust pipes 15, and a plurality of concrete injecting pipes 17. The pipes 13 are each connected to pipe 11 through branch pipes 19 which may include a valve 21.

The steam injecting pipes 13 are projected into the the soil over a portion of the surface of the region R over which the foundation is to be formed. At the outlet end in the ground each pipe 13 is formed with an elliptical opening 23 so that any steam flowing through it is projected in a direction parallel to the surface of the region R. In accordance with the broader aspects of this invention, the pipe 13 may also be provided at its outlet end with an elbow through which the steam is projected parallel to the surface of the ground.

The concrete injecting pipes 17 are each projected into the region at points adjacent the points in which the steam injection pipes are driven. As a matter of fact, the pipes 13 and 17 may be mounted in sets of two as a single unit and each unit may be dropped into a hole in the region having dimensions adequate to accommodate both pipes.

The exhaust pipes 15 are projected into the region at points displaced from the steam injecting and concrete injecting pipes 13 and 17. The spacing should be such that until a substantial cavity is formed, the exhaust pipes will not conduct substantial steam. The steam, concrete and exhaust piping 17 and 13 and 15, respectively, shall be so disposed in the region R as to facilitate the creation of the greatest possible size cavity. Preferably the steam and concrete pipes 13 and 17 and the exhaust pipe 15 should be so spaced that the separation between them reasonably approaches the maximum available from the area under which the rock foundation is to be produced. Thus, the pipes 13 and 17 and 15 and may be spaced as shown in Fig. 1 along opposite boundaries of a rectangular area or the pipes 13 and 17 may be along the periphery of an area and the pipes 15 in or near the center. Where the region R is very large it may be subdivided into sections and each section treated as a separate unit.

The apparatus also includes a first plurality of pumps 1P and a second plurality of pumps 2P. These pumps are in accordance with the specific aspects of this invention of the steam driven type and may be connected to the steam source S through pipe 11 and bleeder branches 31 and 33, respectively, which include valves 35 and 37, respectively. Additional facilities, such as gas engines, for operating the pumps 1P and 2P are thus dispensed with.

The exhaust pumps 1P are each connected to the exhaust pipe 15. The concrete exhausting pumps 2P are each connected between a concrete injecting pipe 17 and the concrete container C so that when they are in operation the pumps 2P inject the concrete through the concrete injecting pipes 17.

In the practice of this invention, the steam source S is energized to generate the steam and the steam is projected into the soil in the region R through the steam injecting pipes 13. At the same time the exhaust pumps 1P are actuated and begin to pump out the exhaust pipes 15, but initially, the pumps 1P pump out no appreciable steam. At this time the concrete injection pumps 2P are quiescent.

As the steam is projected through the steam injecting pipes 13, it flashes out the moisture in the region where it is projected. The flashed out moisture is vaporized expanding rapidly and compressing the soil so as to produce a cavity K. It is to be kept in mind that the heat of the superheated steam should be used as effectively or efficiently as practicable. For this reason it is desirable that a minimum of heat loss be effected by the expansion of the superheated steam. It is believed that this object is at least to a large extent accomplished by the elliptical opening 23 in the steam injecting pipes.

As the cavity K expands it eventually encompasses the region where the exhaust pipes 15 are disposed. The pumps connected to the exhaust pipes then begin to pump mud and steam. At this point it is known that a substantial cavity K has been formed and the concrete pumps 2P are actuated causing the concrete to be injected into the cavity. The concrete is injected under pressure and jams into the walls of the cavity, filling the cavity. When the cavity has been well filled, the pumps 1P again fail to pump out steam. At this point, the steam injecting, concrete injecting and exhaust pipes 13, 17, 15 may be removed from the concrete and the concrete may be permitted to set. Once the concrete is set it provides a bed-rock foundation under the region R.

It is seen that in accordance with this invention a solid foundation having the properties of bed-rock is provided in a relatively simple manner in a short time and with a minimum of apparatus. While certain specific embodiments of this invention have been shown and described herein, many modifications thereof are feasible. This invention, therefore, is not to be restricted except insofar as is necessitated by the spirit of the prior art.

I claim as my invention:

1. Apparatus for producing a rigid foundation in a region having soil material with a high water content comprising in combination means for producing superheated steam, steam injecting pipe means projecting into said region, means connecting said producing means to said pipe means, to inject steam into said region to produce a cavity in said region, first pump means, exhausting pipe means projecting into said region, means connecting said exhausting pipe means to said pump means, said exhausting pipe means being spaced from said injecting pipe means a distance such that said exhausting pipe means extends into said region near the boundary of said cavity whereby said pump means is effective to exhaust steam from said injecting pipe means through said cavity, setting-material injecting pipe means projecting into said region adjacent said steam injecting pipe means so as to extend into said cavity, second pump means, a container for setting material, and means connecting said container to said setting-material injecting pipe means through said second pump means whereby said second pump means may project said setting material into said cavity.

2. The method of producing a rigid foundation in a region having soil material with a high moisture content with apparatus including steam producing means, first pump means, second pump means, and setting-material supply means, which comprises introducing steam from said producing means into a first portion of said region, to produce a cavity in said portion under the action of the pressure of steam produced by flashing the moisture in said region into steam substantially simultaneously actuating said first pump means to produce an exhausting action in a second portion of said regions spaced from said first portion a distance such that the second portion is near the boundary of said cavity whereby said steam will be exhausted through said cavity, and actuating said second pump means to inject said setting-material when said first pump means starts to exhaust steam in substantial quantities.

3. Apparatus for producing a cavity in the soil material of a region which has a soil material of high water content comprising in combination means for producing super-heated steam, steam injecting pipe means projecting into said region, means connecting said producing means to said pipe means, to inject steam into said region to produce a cavity in said region, pump means, exhausting pipe means projecting into said region, and means connecting said exhausting pipe means to said pump means, said exhausting pipe means being spaced from said injecting pipe means a distance such that said exhausting pipe means extends into said region near the boundary of said cavity whereby said pump means is effective to exhaust steam from said injecting pipe means through said cavity.

4. Apparatus for producing a cavity in the soil material of a region which has a soil material of high water content comprising in combination means for producing super-heated steam, steam injecting pipe means for projecting into said region, means connecting said producing means to said pipe means, to inject steam into said region, to produce a cavity in said region, pump means of the steam driven type, means connecting said pump means to said steam producing means to be driven thereby, exhausting pipe means projecting into said region, and means connecting said exhausting pipe means to said pump means, said exhausting pipe means being spaced from said injecting pipe means a distance such that said exhausting pipe means extends into said region near the boundary of said cavity whereby said pump means is effective to exhaust steam from said injecting pipe means through said cavity.

5. Apparatus for producing a cavity in the soil material of a region which has a soil material of high water content comprising in combination means for producing super-heated steam, steam injecting pipe means projecting into said region, said pipe means having an outlet having an opening the plane of which is generally perpendicular to the surface of said region so that the steam is injected through said opening into said soil material in a direction generally parallel to the surface of said region, means connecting said producing means to said pipe means, to inject steam into said region, to produce a cavity in said region, pump means, exhausting pipe means projecting into said region, and means connecting said exhausting pipe means to said pump means, said exhausting pipe means being spaced from said injecting pipe means a distance such that said exhausting pipe means extends into said region near the boundary of said cavity whereby said pump means is effective to exhaust steam from said injecting pipe means through said cavity.

6. Apparatus for producing a cavity in the soil material of a region which has a soil material of high water content comprising in combination means for producing super-heated steam, steam injecting pipe means projecting into said region, said pipe means being of generally circular section and having an outlet in the region of said soil of generally eliptical section, means connecting said producing means to said pipe means, to inject steam into said region, to produce a cavity in said region, pump means, exhausting pipe means projecting into said region, and means connecting said exhausting pipe means to said pump means, said exhausting pipe means being spaced from said injecting pipe means a distance such that said exhausting pipe means extend into said region near the boundary of said cavity whereby said pump means is effective to exhaust steam from said injecting pipe means through said cavity.

References Cited in the file of this patent

UNITED STATES PATENTS

| | | |
|---|---|---|
| 416,180 | Neukirch | Dec. 3, 1889 |
| 1,403,306 | Francois | Sept. 26, 1922 |
| 1,952,162 | Gee | Mar. 27, 1934 |
| 2,099,328 | Casagrande | Nov. 16, 1937 |
| 2,232,898 | Ackley | Feb. 25, 1941 |
| 2,235,695 | Ackley | Mar. 18, 1941 |
| 2,254,252 | Wertz | Sept. 2, 1941 |
| 2,363,108 | Poulter | Nov. 21, 1944 |
| 2,403,643 | Dresser | July 9, 1946 |

FOREIGN PATENTS

| | | |
|---|---|---|
| 291,766 | Switzerland | July 15, 1953 |

OTHER REFERENCES

Business Week, April 23, 1955, pages 84 and 85.